United States Patent [19]

Mecklenborg

[11] 4,205,224
[45] May 27, 1980

[54] BINOCULAR VIEWING TECHNIQUE

[75] Inventor: Richard A. Mecklenborg, Binghamton, N.Y.

[73] Assignee: The Singer Company, Binghamton, N.Y.

[21] Appl. No.: 923,661

[22] Filed: Jul. 11, 1978

[51] Int. Cl.² ............................................. G01J 1/20
[52] U.S. Cl. .................................. 250/201; 350/145; 350/174
[58] Field of Search ................ 250/201; 350/145, 131, 350/132, 174; 358/88, 89, 90, 91, 92; 324/207

[56] References Cited

PUBLICATIONS

"3-D Computer Graphics Using PLZT Electrooptic Ceramics", by McCleary et al. as published in SID 78 Digest, pp. 16–17.
"Stereoscopic Viewing with PLZT Ceramics", Roese et al., published in Ferroelectrics, 1976, vol. 10, pp. 67–51.

*Primary Examiner*—David C. Nelms
*Assistant Examiner*—Darwin R. Hostetter
*Attorney, Agent, or Firm*—J. Dennis Moore; Jeffrey Rothenberg

[57] ABSTRACT

Visual images in proper perspective are optically displayed to each eye of one or more movable observers through a common display system. Real images of aperture stop pupils continuously track their respective eyepoints when the eyepoints change location. Each of the individual images as confined by their respective real pupil images are viewed at their corresponding eyepoints without optical interference.

16 Claims, 10 Drawing Figures

BINOCULAR VIEWING TECHNIQUE

The Government has rights in this invention pursuant to Contract No. F33657-77-C-0181 awarded by the Department of the Air Force.

FIELD OF THE INVENTION

This invention relates to the viewing of images optically displayed and more particularly to binocular viewing of images whereby only an image corresponding with a particular eye is viewed by the particular eye thereby allowing an observer to view a display system using retinal disparity.

DESCRIPTION OF THE PRIOR ART

The manner in which the eyes of an observer view an object conveys to the observer his physical relationship with respect to the object. Monocular vision by an individual can be characterized by the fact that both eyes see the same object. When objects located at long distances are viewed by an observer his eyes see the same object in the same perspective. As objects to be viewed become closer and closer to the viewer each eye does not see the same object in the same perspective. Since separate images are formed at each eye an observer's vision becomes binocular. An observer can judge his relationship to objects close to him by employing binocular vision.

Use of an aircraft simulator is a modern well known method of training aircraft personnel. In a simulator the trainee is placed in a realistically recreated aircraft environment designed such that the trainee feels he is in and operating an actual aircraft without leaving the ground. An important element used to create this realism is the visual display system. Many training judgments depend on the students response to a visual cue.

During flight operations a pilot, for instance, views his external environment through his aircraft window. The pilot typically uses monocular vision to judge objects such as ground areas or other aircraft which are typically at long distances from the pilot's viewing point.

Some aircraft simulation, however, requires in addition, binocular vision to create visual realism. This becomes particularly apparent when the aircraft simulated is a military fuel tanker employing a boom for in-flight refueling controlled by a boom operator situated within the belly of the tanker. The boom operator views the boom, located very close to a viewing window, so that he can control the boom movement so as to correctly position the boom in relation to the aircraft being refueled. The boom being at a short distance from the pilot would generate a separate image at each eye of the boom operator viewing the boom. A simulator for training boom operators would thereby require a technique of binocular viewing that would produce a realisitc visual cue. Typical prior art simulators employing a visual display system generate only monocular cues. Visual display systems which provide solely monocular cues limit the viewing effectiveness when objects close to the observer are being viewed.

Some binocular viewing systems have been developed for particular applications. Co-pending application "Optical System for Multiple Viewing Points" by A. Collier can create binocular vision by employing means to blank each viewing point at a rate such that sequentially displayed images corresponding with each viewing point will appear to each eye as being continuous. In Collier's application glasses with blanking elements are worn by the observer. This technique however does not have application in those instances where glasses are not permitted, as would be the case for a typical glassless boom operator as compared with a fighter pilot normally wearing a helmet having visor glasses.

With aircraft and other type simulators being extensively used a need arises for simulation systems that have a high degree of realism. Proper training requires accurate visual systems. It becomes particularly necessary in those simulators which are recreating situations requiring binocular vision that a visual system be provided which accurately simulates this significant visual cue.

SUMMARY OF THE INVENTION

It is therefore a principal object of the present invention to provide binocular viewing of images in proper perspective optically displayed to each eye of a movable observer whereby only an image corresponding with a particular eye is viewed at the particular eye.

It is another object of the present invention to provide binocular viewing for more than one movable observer simultaneously.

It is another object of the present invention to provide binocular viewing without employing any blanking means, such as glasses located at the observer eyepoints.

It is still another object of the present system to provide binocular viewing of images optically displayed through a common display system to each observer's eyes.

According to the present invention the location of each eyepoint relative to images to be presented by a common display is determined. Images to be viewed at a particular eye are developed in proper perspective as determined by the location of the eyepoint. Each of these images are projected through corresponding aperture stop pupils so that the images are focused upon optical transfer means. Each of these images are then optically transmitted by the display system to their respective eyepoints while real images of each of the pupils are simultaneously focused at each of the respective eyepoints. The optical transfer means are controlled such that real images of each of the pupils continuously track their respective eyepoints when the eyepoints change location. Each of the individual images as confined by their respective real pupil images are thereby viewed at their corresponding eyepoints in their proper perspective without optical interference from any other developed images.

The foregoing and other features and advantages will become more apparent in light of the following description of the present invention as illustrated in the accompanying drawings.

DETAILED DESCRIPTION

Figure 1:
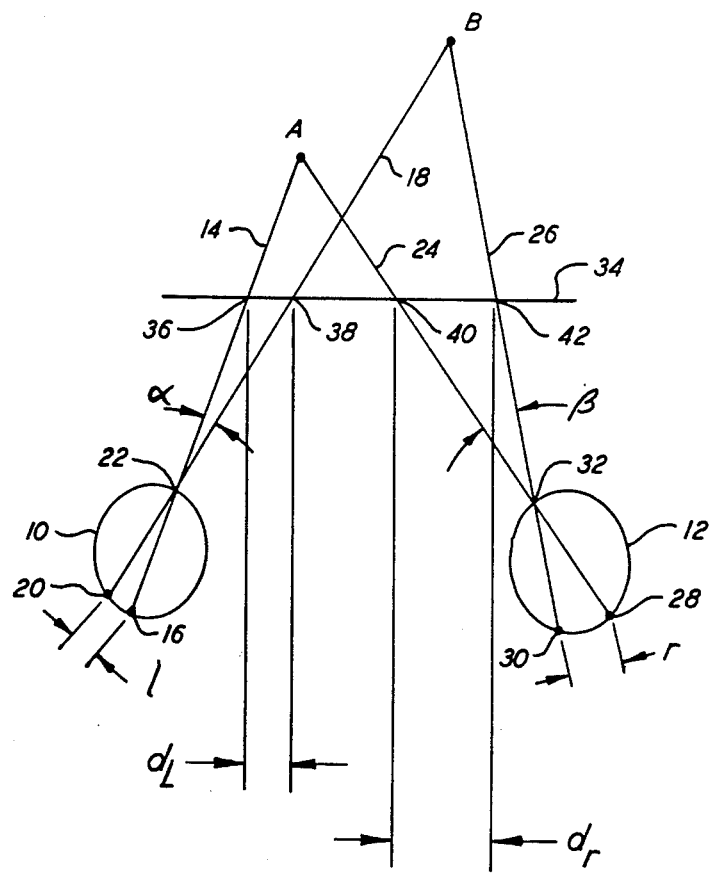
FIG. 1 is a schematic representation illustrating retinal disparity.

Binocular vision is important as an aid in determining an observer's relationship to viewed objects located in close proximity to the observer. This is due to the fact that retinal disparity exists when close objects are viewed by a pair of eyes. Referring to FIG. 1, a schematic view of two eyes 10 and 12 is seen where each eye is viewing two objects A and B. Eye 10 views object A along line of sight 14. An image of object A is formed at the retina of eye 10 at point 16. Eye 10 also views object B along line of sight 18 forming an image of object B at point 20. The distance between points 16 and 20 is defined as "l". "l" is therefore determined by the relationship between objects A and B as lines of sight 14 and 18 pass through the pupil 22 of eye 10 at angle $\alpha$. In the same manner lines of sight 24 and 26 form images at points 28 and 30 respectively through pupil 32 and angle $\beta$. The distance between points 28 and 30 is defined as "r". If angle $\alpha$ is different from angle $\beta$, "l" and "r" will be different and retinal disparity occurs. Since neither eye 10 or eye 12 alone will properly portray the relationship of objects A and B to an observer having two eyes, both eyes must simultaneously focus on the same objects and allow the observer to make a proper relationship judgment.

Still referring to FIG. 1, the top view of a display surface is schematically represented by line 34. A visual system as employed in simulators would project on such a display images in their proper perspective as determined by the location of an eyepoint relative to the display. Lines of sight 14, 18, 24 and 26 would cause visual images of objects A and B to be developed on the display surface at points 36, 38, 40, and 42 respectively. The distance between points 36 and 38 is defined by distance $d_l$ and the distance between points 40 and 42 is defined by distance $d_r$. Distances $d_l$ and $d_r$ are respectively related to distances "l" and "r" thereby also establishing retinal disparity according to image locations required by a visual display of the viewed objects.

Realizing that typical visual displays present complex scenes containing multiple images, for sake of discussion simplicity the principles employed by the present invention will be discussed for the time being in terms of a single displayed image. Complex scenes will employ a multitude of images generated in the same manner.

Modern simulator visual systems can develop images to be viewed by an observer in various manners. Images can be produced on film to be transmitted by a typical film projector. An electronic camera can view a model and transmit an image by electronic processing for display on a raster scan television screen. Other visual systems employ computer generated images whereby electronic data corresponding to images visually to be displayed is generated and upon command portions of this data corresponding to a desired visual display is transmitted to electronic devices which develop the desired visual images. Once a visual image is produced it then becomes necessary to efficiently convey the image to an eyepoint by an optical transmission and display system.

Figure 2:
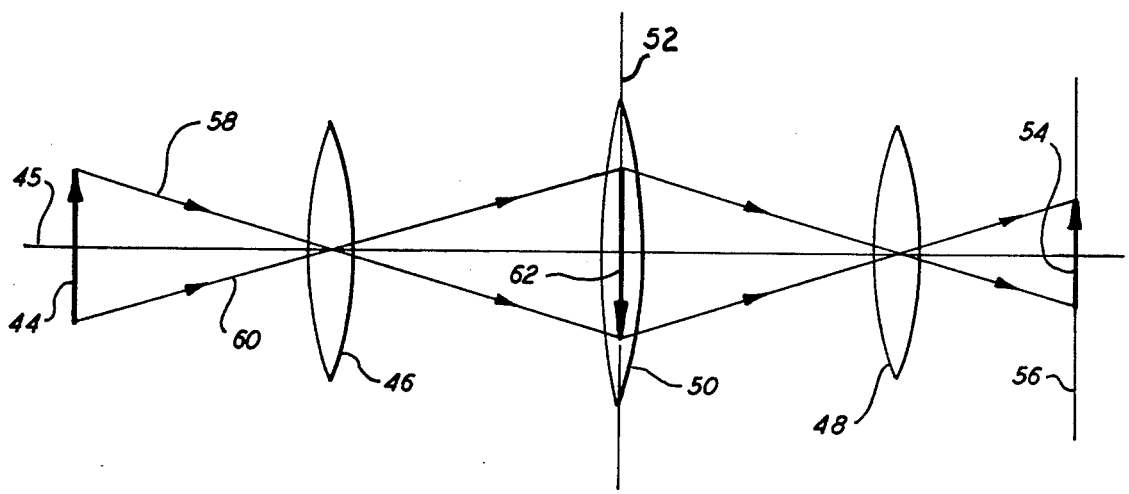
FIG. 2 is an optical schematic showing image development.

To appreciate the techniques of the present invention optical principles employed by the present invention must be considered. Referring to FIG. 2, a visual image 44 can be transmitted by an optical system having an optical axis 45 and employing relay lenses 46 and 48 and field lens 50 having a principal plane 52 such that a new image 54 is focused on plane 56. Rays of light 58 and 60 emerging from image 44 are transmitted by relay lens 46 and form an image 62 on principal plane 52 of field lens 50. Field lens 50 collects the rays of light and redirects them without light loss. Relay lens 48 then transmits the redirected rays to develop the new image 54.

Figure 3:
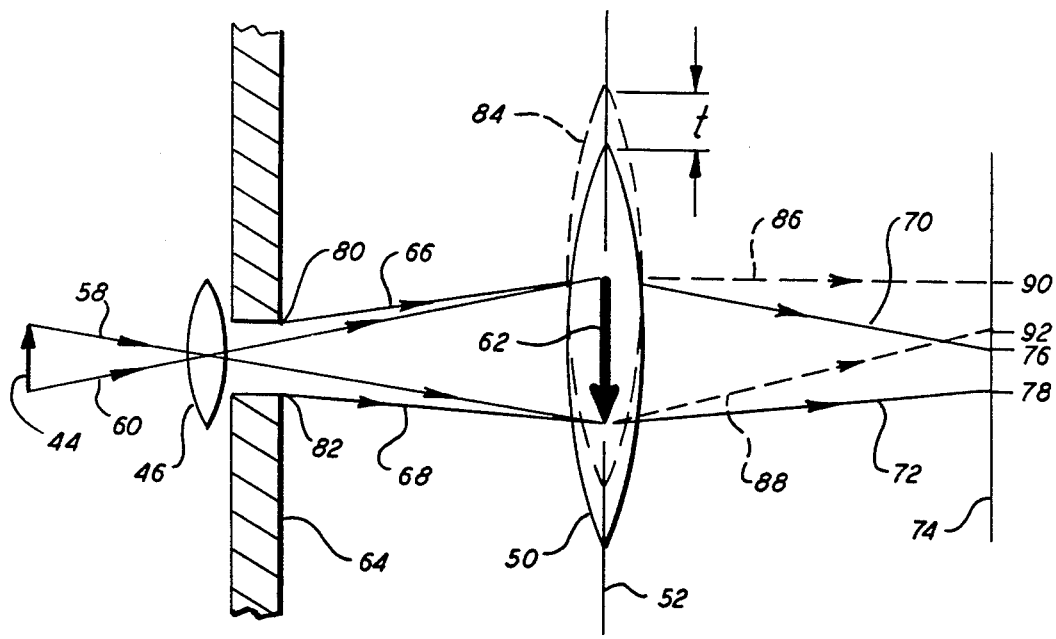
FIG. 3 is an optical schematic illustrating the fundamental concept of the present invention.

Referring to FIG. 3, image 62 is developed on field lens 50 by rays 58 and 60 transmitted by lens 46 from developed image 44. An aperture stop 64 having a pupil defined by edges 80 and 82 is located so as to allow image rays 58 and 60 to pass therethrough. Rays of light 66 and 68 from edges 80 and 82 of pupil 64 pass through field lens 50 without having edges 80 and 82 focused thereon, and emerge as rays 70 and 72 respectively. A plane 74 is located such that images 76 and 78 corresponding to aperture stop pupil edges 80 and 82 are focused on plane 74. While image 62 is focused on principal plane 52, field lens 50 is translated in the principal plane 52 through some distance t and becomes relocated field lens 84 (shown as dotted lines for clarity). After relocation, pupil rays 66 and 68 will emerge from relocated lens 84 in different directions from those where they would have emerged when non-relocated. The magnitude of direction change is proportional to the amount of translation and lens characteristics. Ray 70 would emerge as ray 86 and ray 72 would emerge as ray 88. Images 76 and 78 would translate and become relocated images 90 and 92 respectively. Since image 62 still remains focused in the principal plane, image 62 does not change location. Rays defining the aperture stop pupil edges, not being focused on the principal plane, will change direction upon passing through the field lens.

Figure 4:
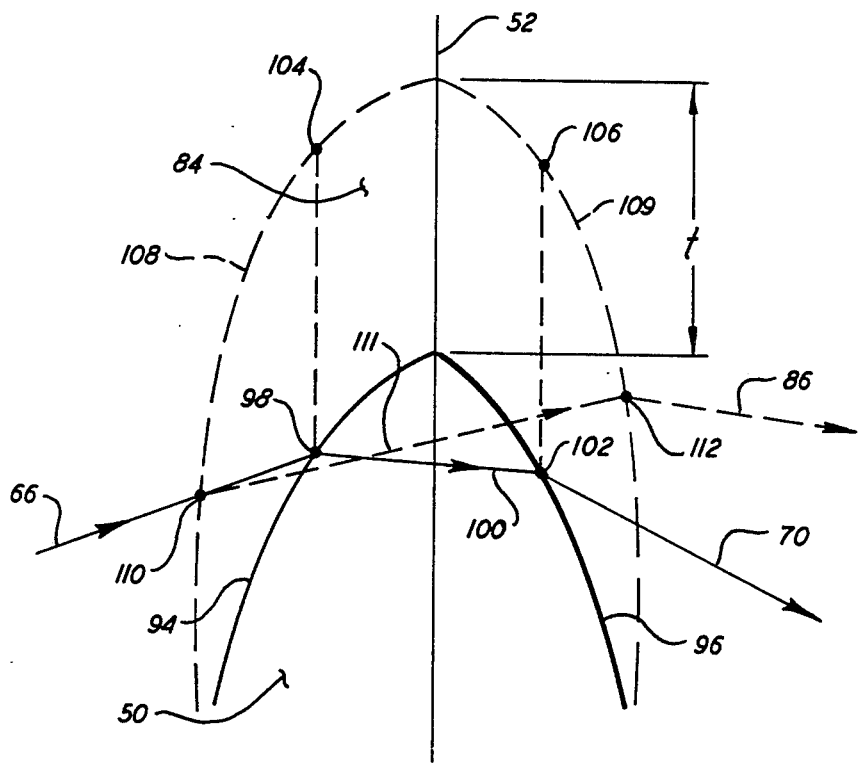
FIG. 4 describes by optical schematic direction shift caused by lens translation.

In FIG. 4 the principles of direction change can be seen. Field lens 50 has an incident lens surface 94 and an emergent lens surface 96. Ray of light 66 becomes incident on surface 94 at point 98, diffracts along ray 100 in accordance with Snell's law and dependent on the angle of incidence, and emerges from surface 96 at point 102 forming ray 70. When lens 50 is translated through some distance t in the principal plane points 98 and 102 change locations in turn and become relocated at points 104 and 106 respectively. Incident ray 66 intersects relocated lens surface 108 (shown dashed for clarity) at point 110. Since typical field lens' surfaces are curvature the same incident ray will intersect the translated lens but in a different location and at such a different angle of incidence as determined by the shape of the lens surface. Ray of light 66 would then diffract along ray 111 emerge from surface 109 at point 112 and form ray 86.

Figure 5:
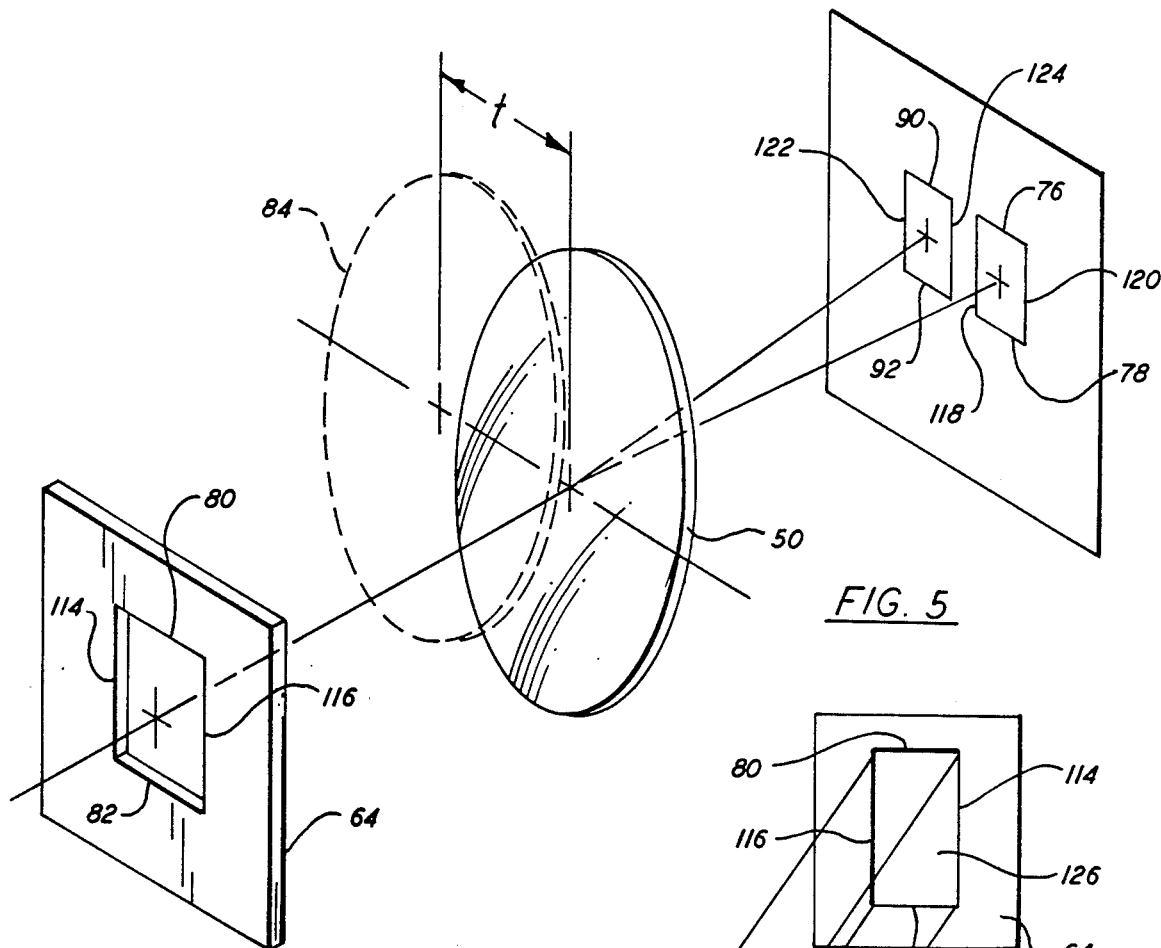
FIG. 5 illustrates in perspective pupil shifting by lens translation.

Referring to FIG. 5 a perspective view is seen showing the effect of shifting the pupil image. Aperture stop 64 has a pupil defined by edges 80, 82, as shown in FIG. 3 and further defined in this perspective view by edges 114 and 116. The pupil shown is a square but could be circular or other desired shape. When lens 50 is untranslated, light passing through the pupil as confined by edges 80, 82, 114, and 116, forms pupil images defined by edges 76, 78, 118 and 120 respectively. Upon translation of lens 50 by some distance t to a position represented by lens 84, edges 80, 82, 114, and 116 form their images 90, 92, 122 and 124 respectively.

Figure 6:
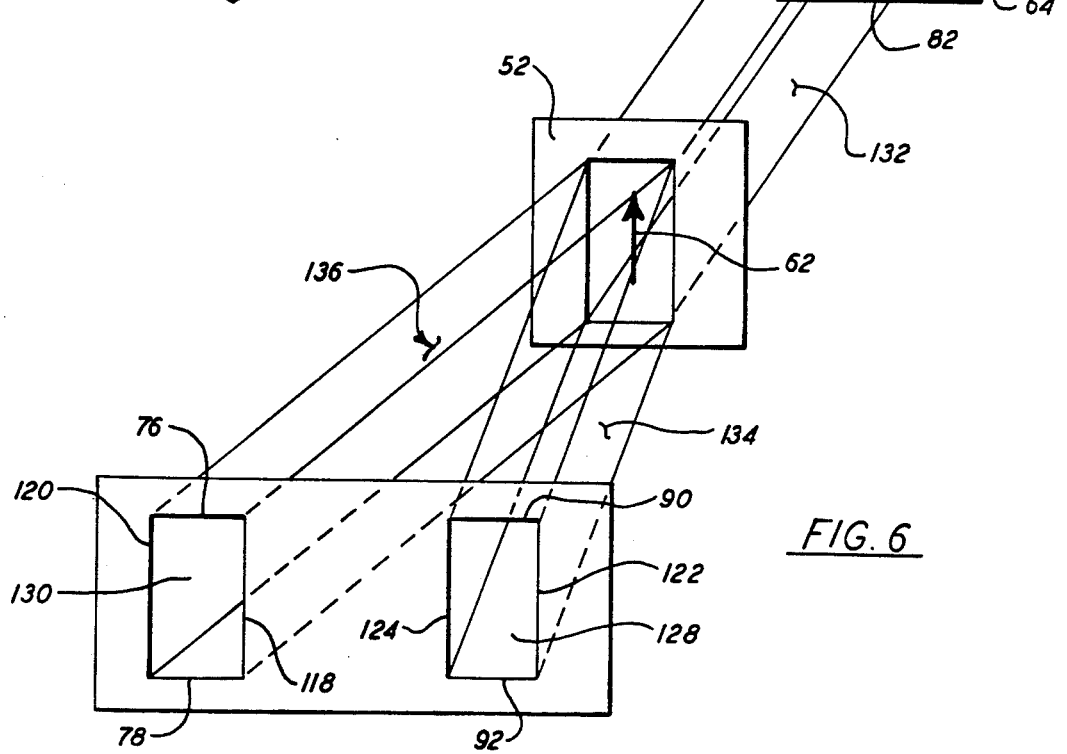
FIG. 6 is an illustration of the effect of pupil shifting and image viewing.

By projecting an image to be viewed through an aperture stop pupil whose edge images can be shifted without changing the image to be viewed lends itself effectively to accomplishing viewing at movable viewing locations. FIG. 6 schematically shows the combination of pupil shifting and image viewing. Image 62 is focused on a lens principal plane 52. Aperture stop 64 has a confining pupil surface 126 as defined by edges 80, 82, 114, and 116. Depending upon lens translation, confining surface 128 as defined by edge images 90, 92, 122 and 124, or surface 130 as defined by edges 76, 78, 118, and 120 are formed. The surface 126 effectively restricts the aperture image size by allowing the image to be confined by the pupil. Light being projected to the principal plane can be thought of as being limited by an optical channel 132. When the pupil shifting is taking place a similar emerging optical channel changes direction resulting, for example, in either channel 134 or channel 136. It can be seen therefore that the same image can be viewed from two different directions enabling a movable eyepoint to be continually tracked while still maintaining image viewing capability.

In the preferred embodiment of the present invention an image to be viewed at each particular eye of an observer will be projected simultaneously through respective aperture stop pupils, each image being focused coincidentally on the principal plane of a field lens. The pupils will be located such that corresponding real images are formed about each eye of an observer, thereby allowing each eye to view at its corresponding eyepoint images in proper perspective for each eye without optical interference from the other developed images corresponding with the other eye.

Figure 7:
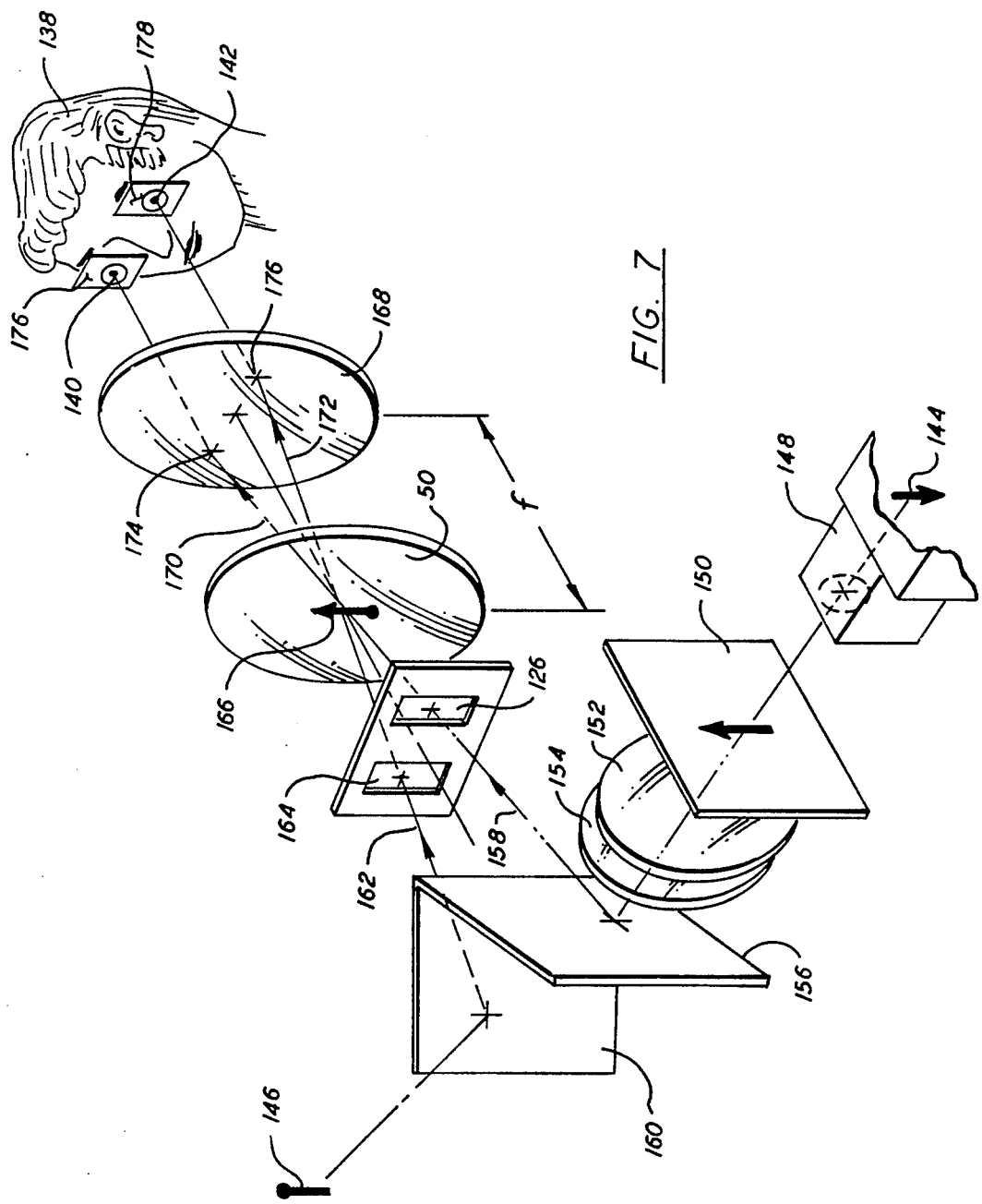
FIG. 7 is a perspective view of the preferred embodiment of the present invention.

Referring to FIG. 7, an observer 138 is desirous of viewing an object using each of his eyes 140 and 142. The location of each eyepoint relative to desired images being produced by viewing system determines the proper perspective in which each eye would view the same object and defines the images to be displayed to each eye. The observer using eye 140 alone would view a developed image 144. Eye 142 would alone view developed image 146. Since each eye desires to be focusing on a single object such as object A of FIG. 1 lines of sight 14 and 24, shown by FIG. 1, must converge on the object. Therefore, in the preferred embodiment of the present invention each image corresponding with a particular eyepoint is simultaneously developed and each are independently optically transmitted so as to coincidentally focus upon the principal plane of a field lens.

As shown in FIG. 7, visual images 144 must be optically transmitted such that each image is coincident upon the principal plane of field lens 50. Image 144 is optically developed by projection means 148 and focused upon a translucent diffusion screen 150. Field lens 152 collects the diffused screen light and redirects the light to relay lens 154 which transmits the redirected light to mirror 156. Mirror 156 redirects the rays of image 144 along direction 158 through pupil surface 126 such that a new image of developed image 144 is focused on the principal plane of lens 50. Image 146 is optically developed and transmitted through a similar diffusion screen, field lens, and relay lens (each not shown) and is redirected by mirror 160 along direction 162 through pupil surface 164 such that a new image of developed image 146 is coincidentally focused upon the new image transmitted corresponding to developed image 144, creating superimposed images 166. A collimating lens 168 is located such that field lens 50 lies at point equal to the focal length f of collimating lens 168. Rays of light from superimposed images 166 diverge such that rays corresponding to image 144 and direction 158 emerges from field lens 50 along direction 170 and rays corresponding to image 146 and direction 162 emerge from field lens 50 along direction 172. Rays following direction 170 intersect collimating lens 168 at point 174 and rays following direction 172 intersect collimating lens 168 at point 176 such that rays corresponding to image 144 will emerge parallel to each other and are received by eye 140 and rays corresponding to image 146 will emerge parallel to each other and are received by eye 142.

If pupil areas 126 and 164 were not situated to restrict rays of light forming superimposed image 166 then optical interference would occur and light corresponding to image 144 could be received by opposite eye 142 and light corresponding to image 146 could be in turn received by opposite eye 140. Pupils areas 126 and 164 are situated such that rays of light corresponding with a particular eye's image will be artificially channeled to that particular eye by forming real corresponding images of each respective pupil at each eye. The size, spacing, and location of the pupils are determined such that real pupil images 176 and 178 independently illuminate their respective eyes without pupil image overlap.

Figure 8:
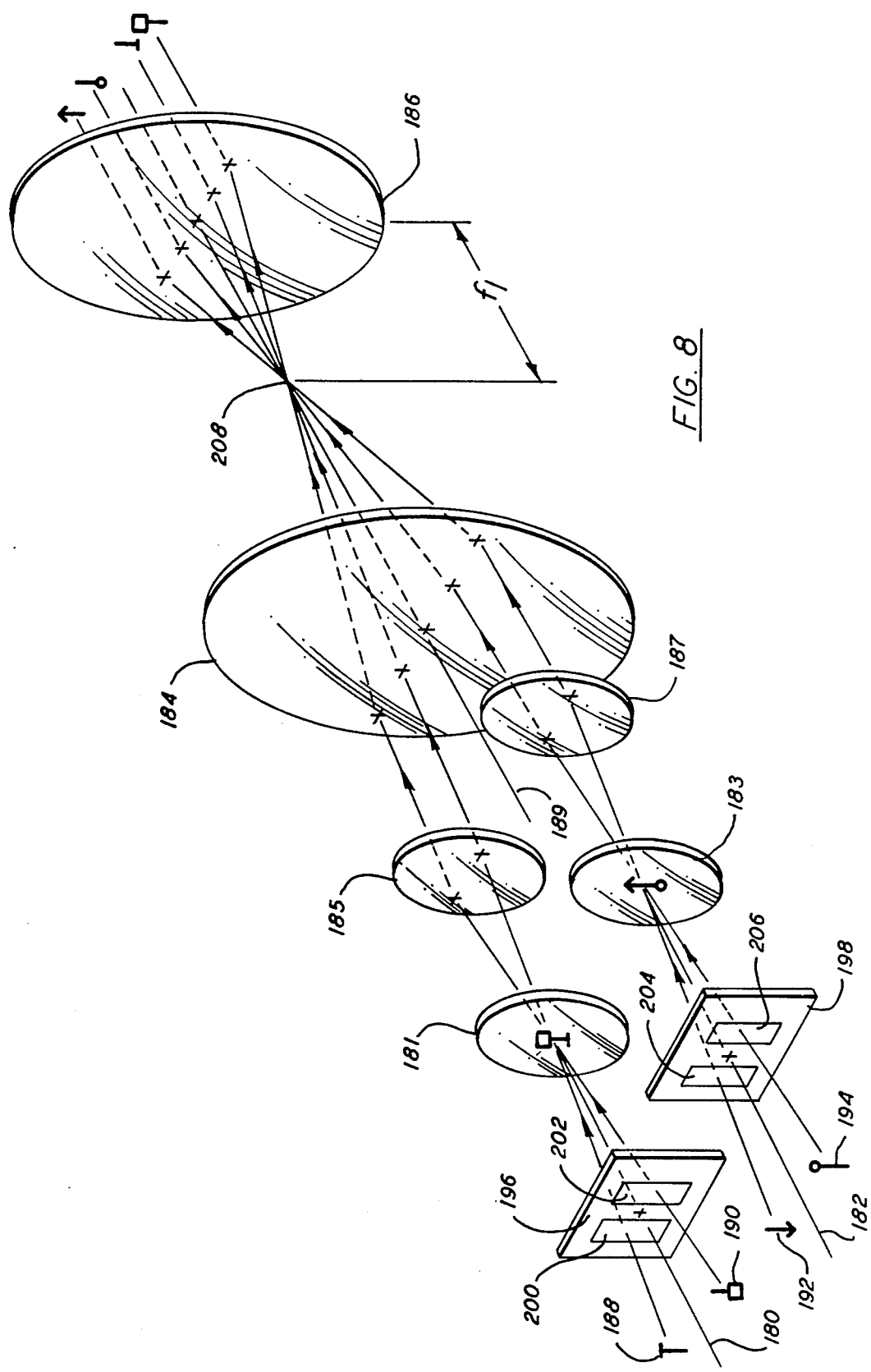
FIG. 8 is a perspective view of the preferred embodiment as utilized for multiple viewers.

Multiple viewers can also take advantage of the present invention to view an object having multiple perspective views associated with different eyepoint locations as shown in FIG. 8. Each of two parallel optical systems having optical axes 180 and 182, field lenses 181 and 183, and collimating lenses 185 and 187, respectively, operate in the manner hereinbefore described. The two systems are combined together by a common decollimating lens 184 and a common collimating lens 186, each having a common optical axis 189, for binocular viewing by a pair of observers. Collimating lens 184 and decollimating lens 186 are situated such that rays of light emanating from developed images 188 and 190 corresponding to one pair of binocular images and rays of light emanating from developed images 192 and 194 corresponding to the second pair of binocular images become coincident at location 208 equal to the focal distance $f_1$ of collimating lens 186. Collimating lens 186 will then distribute the image rays to the viewing eyepoints. Again aperture stops 196 and 198 containing pairs of respective pupil areas 200, 202 and 204, 206 are necessary to channel the respective images to their corresponding eyepoints without interference. FIG. 8 shows conditions for two observers having two eyepoints. Expansion to more than two observers can be easily obtained in the same manner.

By employing the present invention, binocular viewing of images optially displayed through a common display system to each eye of one or more movable observers is achieved.

Figure 9:
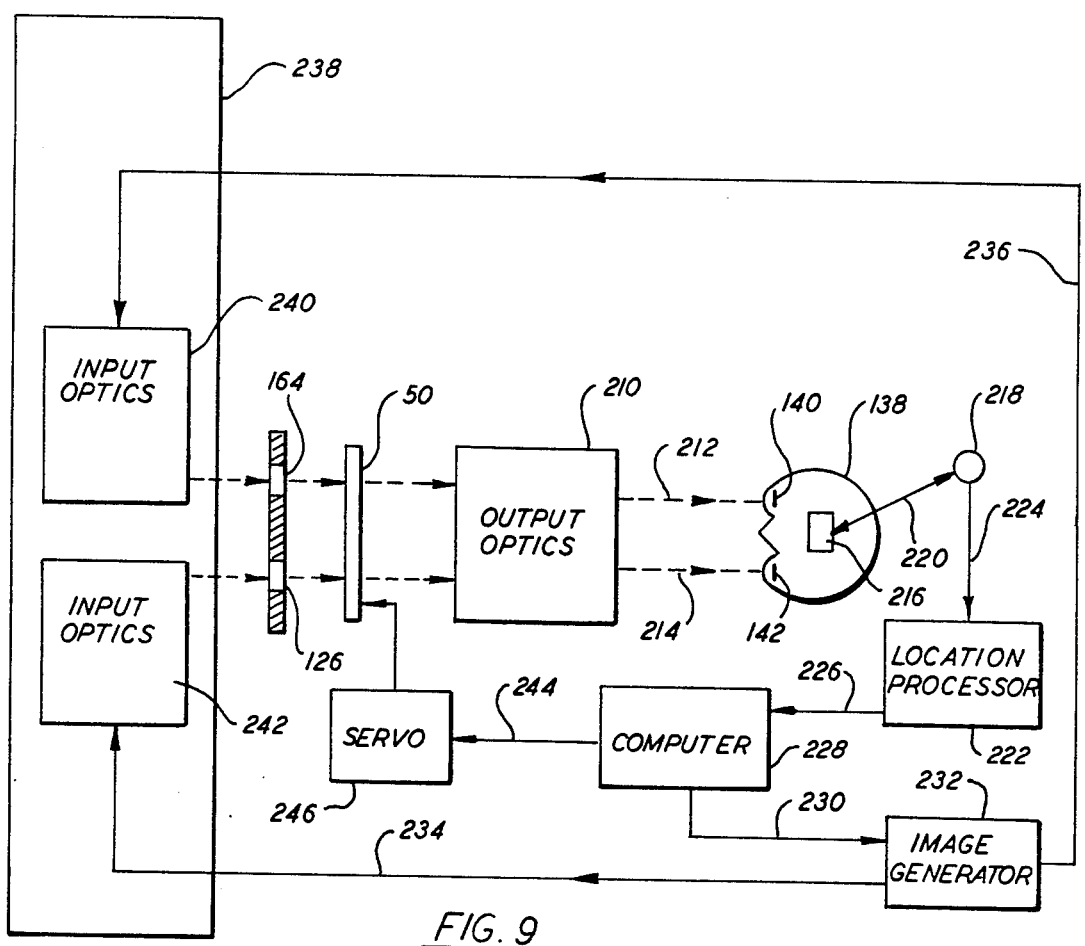
FIG. 9 is a block diagram of the preferred embodiment of the present invention.

In FIG. 9 is shown a block diagram of a system implementing the optical characteristics hereinbefore described. An observer 138 having eyepoints 140 and 142 is seen viewing a display of images as would be presented by output optics 210 along directions 212 and 214 respectively. The output optics hereinbefore described comprise a collimating lens such that images viewed would appear at infinity. Those skilled in the optical art can easily implement other output optical means, whether collimating or non-collimating is desired, such as screen and mirror combinations, for example.

Shown on the head of observer 138 is location monitoring means 216 schematically coupled to a reference point 218 along some direction 220. Reference point 218 is shown schematically coupled to location processor 222 by coupling line 224. The location monitoring means compares the observer's location relative to some fixed reference point. The observer point, in turn his eye position, relative to the reference point position is then converted to electronic signals by location processor 222. These signals fed by line 226 to computer 228 to define in computer terms the observer's position with regard to the image being viewed as displayed by the output optics. Those skilled in the art can employ various types of mechanical or electronic position locating techniques. One such technique is described in U.S. Pat. No. 3,868,565 entitled, "Object Tracking and Orientation Determination Means Systems and Process."

Once the observer's eyepoint locations are determined, appropriate visual images can be developed. Referring back to FIG. 1 images 36 and 38 as displayed on screen 34 are related to the location of eyepoint 10 relative to objects A and B being viewed. In the same manner image points 40 and 42 are related to the location of eyepoint 12 relative to objects A and B. By knowing these eyepoint location visual images can be produced such that each eyepoint can see on a visual display an image in proper perspective which would recreate the actual viewing of a real object from the particular eyepoint location, a key element in producing a realistic visual cue for use in simulation.

In FIG. 9 computer 228, having received eyepoint information concerning the location of observer 138, feeds this information by line 230 to image generator 232. This image generator, of various types as hereinbefore described, can develop visual images corresponding to the desired image to be received by each eyepoint 140 and 142 of observer 138.

Upon computer control images associated with both eyepoints 140 and 142 are simultaneously fed as shown by lines 234 and 236 to input means 238. Input optics means 240 and 242, which each can be the projector/screen/field lens/relay lens/mirror combination as hereinbefore described or other optical transmission means known to those skilled in the art, directs each developed image through their respective pupil areas 126 and 164 to be imaged on field lens 50.

It will become apparent to those skilled in the optical arts that the movable field lens 50, can be substituted for by other optical transfer means whose orientation may also change without changing the image focused thereon while still allowing non-focused light rays incident upon the transfer means to change direction. For example, a mirror capable of rotating about an axis in the plane of the mirror can change direction of light rays incident upon the mirror as determined by the amount of mirror rotation about its axis while maintaining unchanged an image focused upon the mirror at the mirror's axis of rotation. Those skilled in the optical arts could also employ rhomboid mirror combinations, rotating glass plates, and other techniques without departing from the present invention. Needless to say, use of the other optical transfer means necessitates adding additional transfer optics to direct the desired rays of light through the pupils and accomplish the coincident focusing required. Standard optical techniques are readily available to achieve this redirection.

Still referring to FIG. 9, computer 228 knowing the location of eyepoints 140 and 142 can signal by line 244 electro-mechanical servo means 246 which are connected to field lens 50. Servo 246 can reorient lens 50 corresponding to any location change of eyepoints 140 and 142. Optical characteristics of field lens 50 determine the extent of mechanical translation required to allow real images of the pupils to track their corresponding eyepoints.

Figure 10:
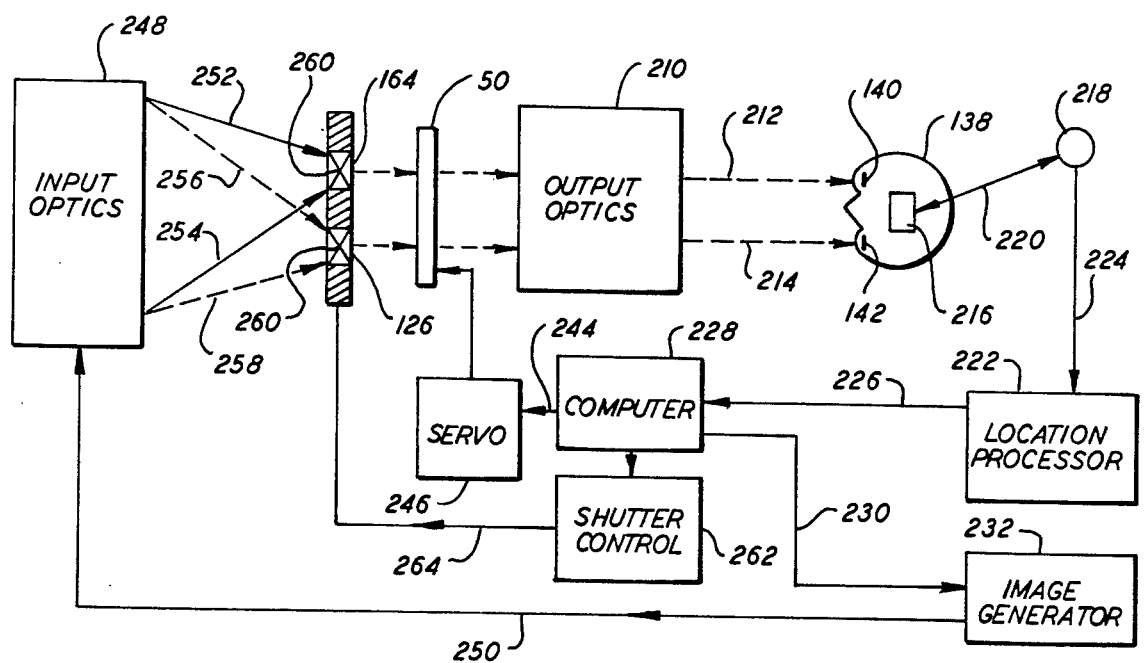
FIG. 10 is a block diagram of another embodiment of the present invention.

In FIG. 10 another embodiment of the present invention is shown. A similar observer 138 having eyepoints 140 and 142 intends to view images presented by output optics 210 along lines 212 and 214. Location monitor 216, coupling 220, reference point 218, and location processor 222 determine eyepoint location. Computer 228 signals image generator 232 to develop images corresponding to desired views as seen by each respective eyepoint. The image generator upon computer control, alternately provides images corresponding to each eyepoint to input optics as schematically shown by direction 250. A single input optics system will alternately project an image corresponding to each eyepoint. Pupils 126 and 164 are situated with respect to the input optics such that either pupil is capable of receiving images provided by input optics 248 as shown by rays 252, 254, 256, and 258. Pupil areas 126 and 164 each contain blanking means 260, schematically represented by X, such as shutters or polarizers, for example. These blanking means are capable of being opened or closed so that light can or cannot pass through the pupil openings when desired. Shutter control 262 by line 264 controls the blanking rate as determined by computer 228. Computer 228 synchronizes the image generation and alternate blanking such that when an image corresponding with a particular eyepoint is projected by the input optics then that pupil corresponding with that eyepoint will only be open and will pass the projected image to be focused upon field lens 50 for ultimate processing by output optics 210. When the alternate image is produced its corresponding pupil will be open and the other pupil blanked. The rate of alternating is such that the image viewed by each eyepoint appears to be continuous. The sequential display embodiment can also readily be adapted for multiple eyepoints by keeping all other eyepoints blanked except for the one viewing the display.

It can be seen that the present invention provides binocular viewing of images in proper perspective optically displayed to each eye of an observer whereby only an image corresponding with a particular eye is viewed at the particular eye. The invention employs a common display system capable of being viewed by multiple observers without the observers having to employ any extra non-necessary elements such as viewing glasses.

This invention has been described in terms of a visual system employed by a simulator so that a trainee can obtain visual realism by binocular viewing. However, it will be readily apparent to those skilled in the art that this invention can be practiced where any binocular viewing of an image is desired. For example, in the teaching of subjects requiring close in vision, such as medical surgery techniques, television cameras can develop each of the images required for binocular viewing. Also the invention is useful wherever remote control within dangerous areas is required, such as in radioactive areas or within inaccessible high temperature furnace operations. It will also be apparent to those skilled in the art that various changes and modifications, some of which have been hereinbefore described, may be made without departing from the invention. The invention is, therefore, intended to cover all such changes and modifications as fall within the true spirit and scope of the invention as defined by the appended claims.

What is claimed is:

1. A method for the binocular viewing of images in proper perspective optically displayed through a common display to each eye of one or more movable observers, whereby only an image corresponding with a particular eye is viewed at said particular eye, such that each observer can view said display using retinal disparity comprising the steps of:
   a. developing each of said images corresponding with a particular eye such that said proper perspective is determined by the location of the eyepoints relative to said images;
   b. projecting of each of said developed images through corresponding aperture stop pupils so that said developed images are coincidentally focused upon optical transfer means, whose orientation is capable of change without changing images focused thereon;
   c. defining said display as having optical properties such that each of said images focused upon said transfer means are viewed by their respective eyepoints, and real images of each of said corresponding pupils are simultaneously focused at each of said respective eyepoints; and
   d. controlling said optical transfer means orientation such that said real images of said corresponding aperture stop pupils continuously track said respective eyepoints when said eyepoints change location, thereby allowing each of said individual images, as confined by their respective real pupil images, to be viewed at their corresponding eyepoints in their proper perspective without optical interference from any other of said developed images.

2. The method of claim 1 wherein the step of developing each of said images comprises the steps of:
   a. providing visual images simultaneously for each pair of said eyepoints; and
   b. independently directing each of said simultaneously provided visual images toward their respective pupils.

3. The method of claim 1 wherein the step of developing each of said images comprises the steps of:
   a. providing in alternate sequence visual images in proper perspective, each of said alternate images corresponding to one of a pair of observer eyepoint locations;
   b. transmitting said alternately provided visual images through blanking means having elements capable of alternately blanking or transmitting either of said provided visual images, each blanking element located such that said provided visual images are projected through its corresponding aperture stop pupil associated with said respective eyepoints so that provided visual images are coincidentally focused upon said optical transfer means but at alternate times; and
   c. controlling both said alternately providing of images and said blanking, synchronously at a rate such that images as viewed at corresponding eyepoints would appear to be continuous.

4. The methods of claims 2 or 3 wherein the step of defining said display comprises the step of locating a collimating lens such that said images focused upon said optical transfer means lie at the focal point of said collimated lens to provide at each of said eyepoints an appearance that said images focused upon said optical transfer means are at infinity.

5. The method of claim 4 wherein the step of projecting each of said developed images comprises the step of projecting said images through said corresponding pupils and coincidentally focusing each of said images upon a principal plane of an optical lens.

6. The method of claim 5 wherein the step of controlling said optical transfer means orientation further comprises the step of translating within its principal plane said optical lens upon which said developed images are focused such that rays of light initially incident upon said lens prior to translation would be incident upon said lens but in different locations resulting from said translation, causing said incident ray to emerge from said lens at angles different from those emerging prior to translation such that said emerging rays of light track said respective eyepoints when said eyepoints change location.

7. The method of claim 6 wherein the step of providing visual images comprises the steps of:
   a. electronically generating image data for each eyepoint location;
   b. selectively transmitting to display means such portions of said data that would produce said visual images which correspond to said location of said observer's eyepoints; and
   c. generating said visual images corresponding to said portions of said transmitted data by said display means.

8. The method of claim 1 further comprising the steps of:
   a. defining as individual optical systems those aperture stops, optical transfer means, and displays associated with particular pairs of eyepoints;
   b. locating in essentially the same plane said aperture stop pupils associated with each of said particular pairs of eyepoints;
   c. locating a common decollimating lens such that each of said images projected through each of said aperture stop pupils and focused upon each of said optical transfer means become imaged at a coincident point; and
   d. locating a common collimating lens such that said coincident point lies at the focal point of said common collimating lens to provide at each pair of eyes associated with each of said individual optical systems an appearance that said images focused upon each of said optical transfer means are at infinity.

9. An apparatus for the binocular viewing of images in proper perspective optically displayed through a common display to each eye of one or more movable observers, whereby only an image corresponding with a particular eye is viewed at said particular eye, such that each observer can view said display using retinal disparity comprising:
   a. means to develop each of said images corresponding with a particular eye such said proper perspective is determined by the location of the eyepoints relative to said images;

b. optical transfer means whose orientation is capable of change without changing images focused thereon;

c. aperture stop pupils each corresponding with a particular developed image, each pupil located such that its particular image passes therethrough in such a manner that each of said developed images are coincidentally focused upon said optical transfer means;

d. a visual display having optical properties such that each of said images focused upon said transfer means are viewed by their respective eyepoints and real images of each of said corresponding pupils are simultaneously focused at each of said respective eyepoints; and e. control means responsive to said means to develop each of said images for optical transfer means orientation such that said real images of said corresponding aperture stop pupils continuously track said respective eyepoints when said eyepoints change location, thereby allowing each of said individual images, as confined by their respective real pupil images, to be viewed at their corresponding eyepoints in their proper perspective without optical interference from any other of said developed images.

10. The apparatus of claim 9 wherein said means to develop each of said images comprises:

a. means to simultaneously provide visual images for each pair of said eyepoints; and b. means to independently direct each of said simultaneously-provided visual images toward their respective pupils.

11. The apparatus of claim 9 wherein said means to develop each of said images comprises:

a. means to provide in alternate sequence visual images in proper perspective, each of said alternate images corresponding to one of a pair of observer eyepoint locations;

b. blanking means having elements capable of alternately blanking or transmitting either of said visual images, located such that said visual images projected through corresponding aperture stop pupils are coincidentally focused upon said optical transfer means but at alternate times; and c. control means responsive to said means to provide visual images for both alternately generating said images and blanking, synchronously at a rate such that images viewed at their corresponding eyepoints would appear to be continuous.

12. The apparatus of claims 10 or 11 wherein said visual display comprises a collimating lens located such that said images focused upon said optical transfer means lie at the focal point of said collimated lens to provide at each of said eyepoints an appearance that said images focused upon said optical transfer means are at infinity.

13. The apparatus of claim 12 wherein said optical transfer means comprises an optical lens having principal plane upon which said images projected through said corresponding pupils are coincidentally focused.

14. The apparatus of claim 13 wherein said control means for optical transfer means orientation further comprises means to translate said optical lens within its principal plane such that rays of light initially incident upon said lens prior to translation would be incident upon said lens but in different locations resulting from said translation, causing said incident rays to emerge from said lens at different angles from those emerging prior to translation such that said emerging rays of light track said respective eyepoints when said eyepoints change location.

15. The apparatus of claim 14 wherein said means to provide visual images comprises means to electronically generate image data for each eyepoint location and to selectively transmit to display means such portions of said data that would produce visual images which correspond to said locations of said observer's eyepoints so that said visual images corresponding to said portions of said transmitted data are generated by said display means.

16. The apparatus of claim 9 further comprising:

a. individual optical systems as defined by those particular aperture stops, optical transfer means, and displays associated with particular pairs of eyepoints, having said pairs of eyepoints located in essentially the same plane;

b. a common decollimating lens such that each of said images focused upon each of said optical transfer means become imaged at coincident points; and c. a common collimating lens located such that said coincident point lies at the focal point of said common collimating lens to provide at each pair of eyes associated with each of said individual optical systems an appearance that said images focused upon each of said optical transfer means are at infinity.

* * * * *